(12) United States Patent
Ford et al.

(10) Patent No.: US 8,151,545 B1
(45) Date of Patent: Apr. 10, 2012

(54) HORSE BOOT WITH CUPPED SOLE

(75) Inventors: Garrett N. Ford, Tucson, AZ (US); Pete Ramey, Lakemont, GA (US)

(73) Assignee: Easycare, Inc., Tuscon, AZ (US)

(*) Notice: Subject to any disclaimer, the term of this patent is extended or adjusted under 35 U.S.C. 154(b) by 281 days.

(21) Appl. No.: 12/498,972

(22) Filed: Jul. 7, 2009

Related U.S. Application Data

(60) Provisional application No. 61/134,117, filed on Jul. 7, 2008.

(51) Int. Cl.
*B68C 5/00* (2006.01)
(52) U.S. Cl. .......................................................... 54/82
(58) Field of Classification Search .................. 54/82
See application file for complete search history.

(56) References Cited

U.S. PATENT DOCUMENTS

| | | | | |
|---|---|---|---|---|
| 4,981,010 A * | 1/1991 | Orza et al. | ........................ | 54/82 |
| 2007/0107389 A1 * | 5/2007 | Ruetenik | .......................... | 54/82 |

* cited by examiner

*Primary Examiner* — Rob Swiatek
*Assistant Examiner* — Lisa Tsang
(74) *Attorney, Agent, or Firm* — Antonio R. Durando

(57) ABSTRACT

A horse boot has a sole that includes a dome portion designed to conform to the frog and sole of a horse's hoof when no pressure is exerted on it. The dome provides a support surface for the frog and hoof sole when the boot is off the ground and it resiliently deforms downward, thereby allowing the frog and hoof sole to deform naturally, when the boot presses against the ground. As a result, the hoof's frog and sole are always supported in resilient manner while allowed to move as needed for their natural function. The pressure exerted by the ground against the edges of the sole of the boot and the simultaneous counter-pressure exerted by the hoof cause the dome in the boot's sole to flatten, thereby slightly increasing its size to accommodate the natural deformation of the hoof.

10 Claims, 7 Drawing Sheets

HORSE BOOT WITH CUPPED SOLE

RELATED APPLICATIONS

This application is based on and claims the priority of U.S. Provisional Application No. 61/134,117, filed on Jul. 7, 2008.

BACKGROUND OF THE INVENTION

1. Field of the Invention

The invention relates in general to articles of footwear for animals and, in particular, to a horse boot with a cupped sole.

2. Description of the Prior Art

Horse boots are used to protect the hooves and fetlocks of horses and are sometimes used in lieu of horseshoes. A horse boot typically consists of a shell that includes a sole with opposed flat, top and bottom, major surfaces and an upper that projects upward from the top surface and forms an enclosure for the hoof and sometime also for a portion of the fetlock of the horse. The shell is commonly of unitary construction, the upper typically extending along the rim of the sole and having an edge integral with or secured to the sole. A second top edge of the upper is remote from the sole and is often connected to a cuff that can be tightened around the hoof and pastern of the horse.

The upper of the shell and the cuff are spread open in order to put the boot on the hoof of the horse. After spreading the upper and the cuff, the boot is slid over the hoof and the cuff is tightened around the pastern to secure the boot in place. The shell is similarly tightened around the hoof in various manners, such as with buckles, elastic restraining devices, or even by gluing the inner surface of the shell to the hoof.

The objective of these various securing means has been to provide a tighter and more secure fit over the hoof of the horse to avoid movement of the boot with respect to the hoof. As a result, the boot is less likely to chafe the hoof or to come off, but it also forms a rigid enclosure that prevents some of the hoof's physiological functions. The hoof of a horse includes two main parts known as the frog and the sole, respectively. The frog is a softer inner portion of the hoof surrounded by the harder sole at the bottom of the hoof. The two together function to provide a pumping action that enhances blood circulation. In bootless wild horses, the frog is always bearing weight because it contacts the ground at each step, a condition that cannot be reproduced with rigid boots with a flat upper sole surface. It is well known that the free hoof expands when it meets the ground and it contracts when it is raised off the ground. This repeated expansion and contraction of the hoof produces a corresponding motion in the frog that has the physiological effect of supplementing blood circulation in the hoof and the lower leg of the horse. The fit of prior-art boots does not account for the shape of the underside of the hoof and for the natural deformation it experiences during riding.

In order to ameliorate the effect of the boot sole on the hoof, cushioning pads have been used as inserts designed to conform to the frog of the hoof. These pads are compression fit or otherwise secured to the top surface of the boot's sole and vary in hardness and resilience. In all cases, they represent a filling structure designed to support the frog but with sufficient resilience to allow its natural contraction and expansion resulting from the horse's gait. Therefore, the efficacy of these pads is based on having the appropriate balance between support and give to try to match the natural environment to which a bootless hoof is exposed. This is impossible to achieve because optimal support and give through pads would necessarily require changes to accommodate different riding conditions and terrain.

Another problem associated with prior-art boot shells is the fact that the width of the sole is fixed, as determined by the size of the boot. Therefore, a tight boot cannot accommodate in any manner the hoof's radial expansion that is associated with the pressure exerted on it by the ground at each step. That is, when the hoof meets the ground, the perimeter (most notably the width) of the hoof tends to expand slightly; when the hoof is lifted, it returns to its un-deformed contracted condition. Thus, if the shell of the boot is selected for a tight fit (which is always the case to ensure stability and prevent abrasion), the shell constrains the hoof to a condition under weight that does not allow its natural expansion/contraction cycle.

This invention is directed at providing a solution to both problems. Specifically, the invention is directed at providing a horse boot with a sole that supports the frog at all times while permitting both its natural motion and the lateral expansion/contraction of the hoof's sole.

SUMMARY OF THE INVENTION

The invention consists of a horse boot with a sole that includes a dome portion designed to conform to the frog and the concave sole area of a horse's hoof when no pressure is exerted on it. Accordingly, the boot's sole features a dome structure with a substantially convex top surface conforming to and substantially in contact with the frog and the concave sole area of the hoof. The thickness of the sole is substantially uniform with a correspondingly concave, cup-like bottom surface below the dome, which provides a sole structure that may be deformed and flattened by pressure applied from either direction. In particular, the dome in the boot sole provides a support for the frog and the hoof sole that varies during the gait cycle. That is, it butts against the frog and the sole area of the hoof when the hoof is off the ground and it resiliently deforms downward, thereby allowing the frog and hoof sole to deform naturally, when the hoof and boot press against the ground. As a result, the frog and the hoof sole are always supported in resilient manner while allowed to move as needed for their natural function.

According to another aspect of the invention, the pressure exerted by the ground against the edges of the sole of the boot and the simultaneous counter-pressure exerted by the frog and hoof sole cause the dome in the boot's sole to flatten, thereby slightly increasing the width of the boot's sole. This deformation is further aided by the lateral forces exerted by the natural expansion of the hoof against the interior of the upper when the hoof presses against the ground. As a result of this flattening and widening of the boot's sole and the corresponding expansion of the shell, the shape of the boot tends to more consistently conform to the shape of the hoof during the gait cycle, thereby providing a better fit.

Moreover, the concave shape of the sole's bottom surface provides an improved tread for traction in soft soil without loss of efficiency in hard ground conditions where, mimicking the natural function of the hoof, the boot of the invention provides traction mainly with the portion of the boot's sole underlying the hoof's sole. Therefore, the boot sole of the invention combines the physiological advantages of a deformable hoof with the natural traction performance of a hoof.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in

DESCRIPTION OF THE PREFERRED EMBODIMENTS

Figure 1:
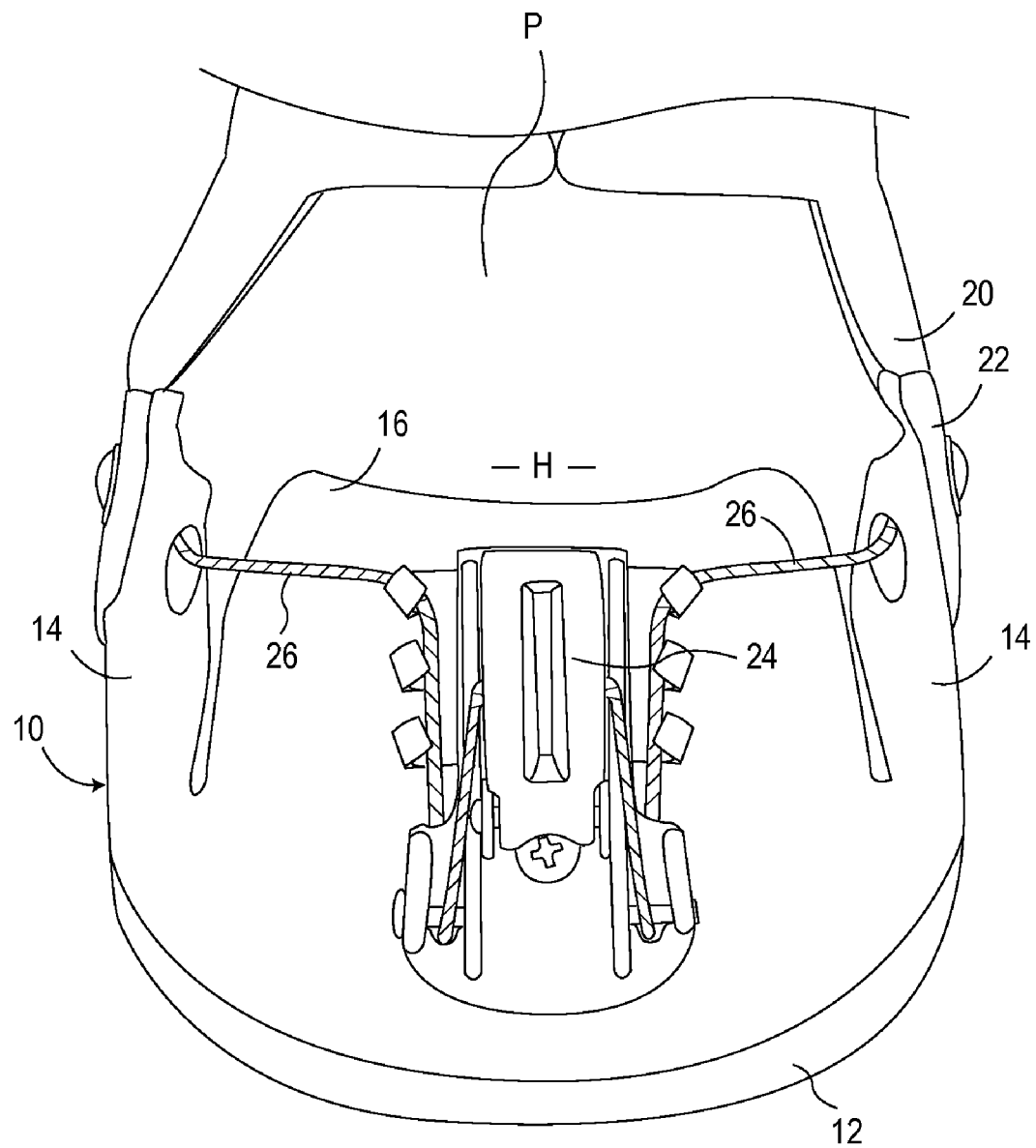
FIG. 1 is a picture showing in top perspective view a conventional horse boot with a shell that encloses the model hoof of a horse and a partially visible gaiter that encloses a portion of the pastern.
Figure 2:
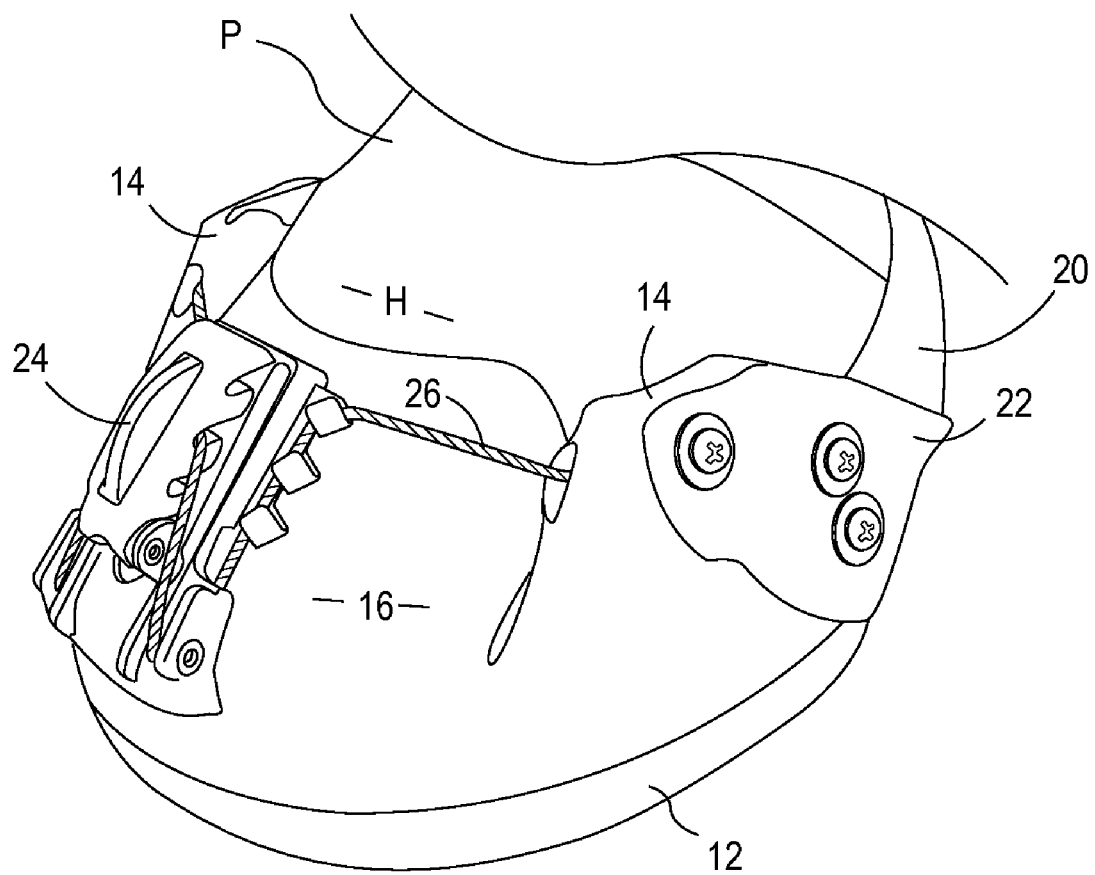
FIG. 2 is a side perspective view of the boot of FIG. 1.

Referring to FIGS. 1 and 2, the shell 10 of a conventional horse boot modified according to the invention is shown, including an upper and a sole 12. The upper includes sidewalls 14, a front tongue 16, and a rear lip 18 (seen in FIG. 3) to which a gaiter 20 (only partially visible) is attached by means of an anchor strap 22. The gaiter wraps around the back of the hoof H and encloses a portion of the pastern P of the horse. A buckle 24 with cables 26 connected to the upper sidewalls 14 is used to tighten the shell of the boot in place over the hoof.

Figure 3:
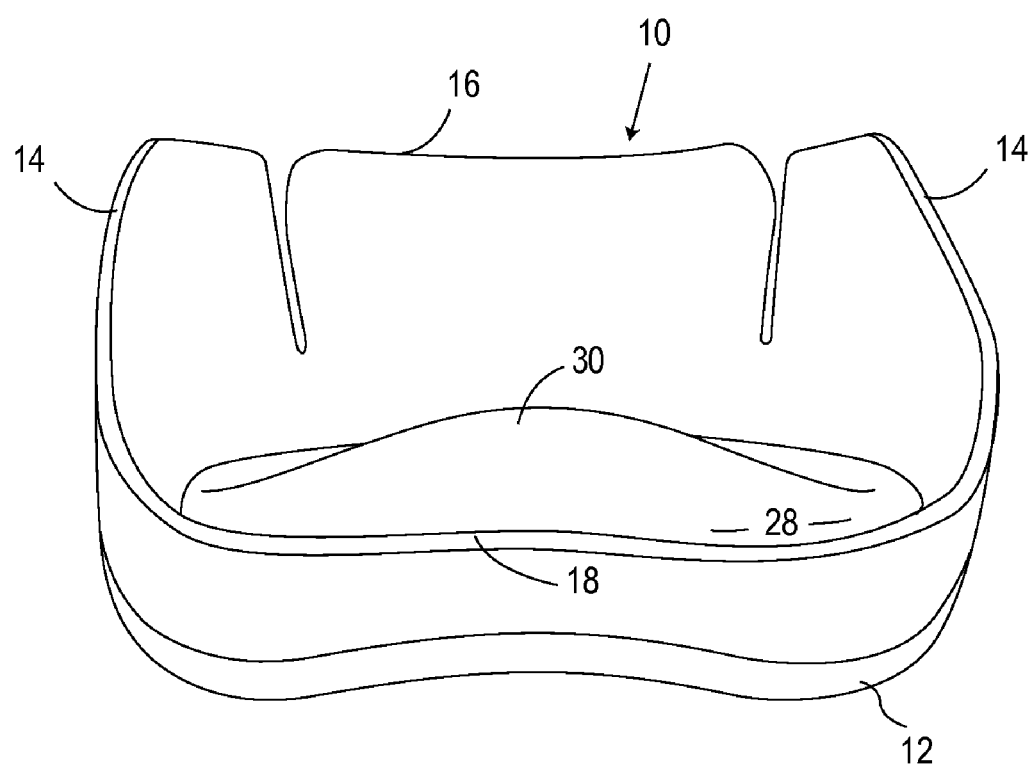
FIG. 3 is a rear perspective view of the shell of the boot (without the gaiter) showing the sole of the invention with a domed-shaped upper surface facing the bottom of the hoof.
Figure 4:
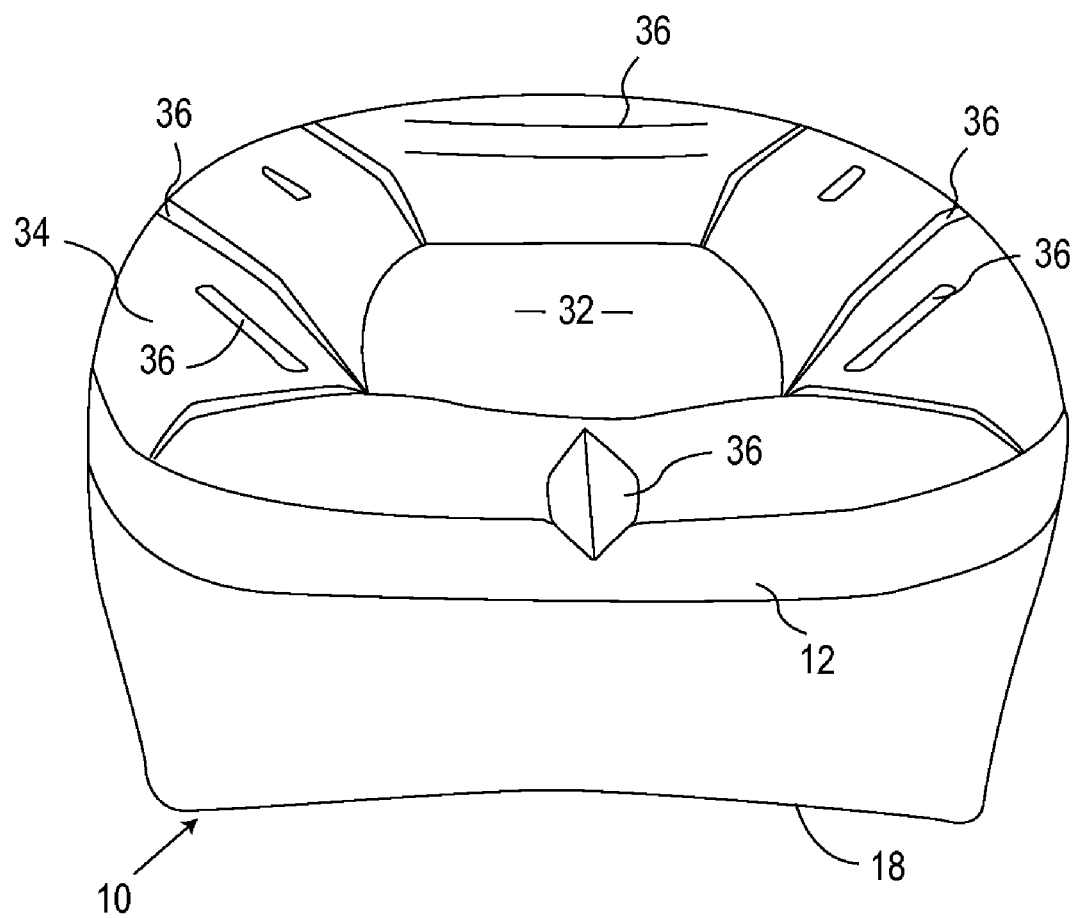
FIG. 4 is a rear perspective view of the bottom surface of the sole of the invention showing the concave bottom surface of the boot sole corresponding to the convex dome on the opposite side.
Figure 5:
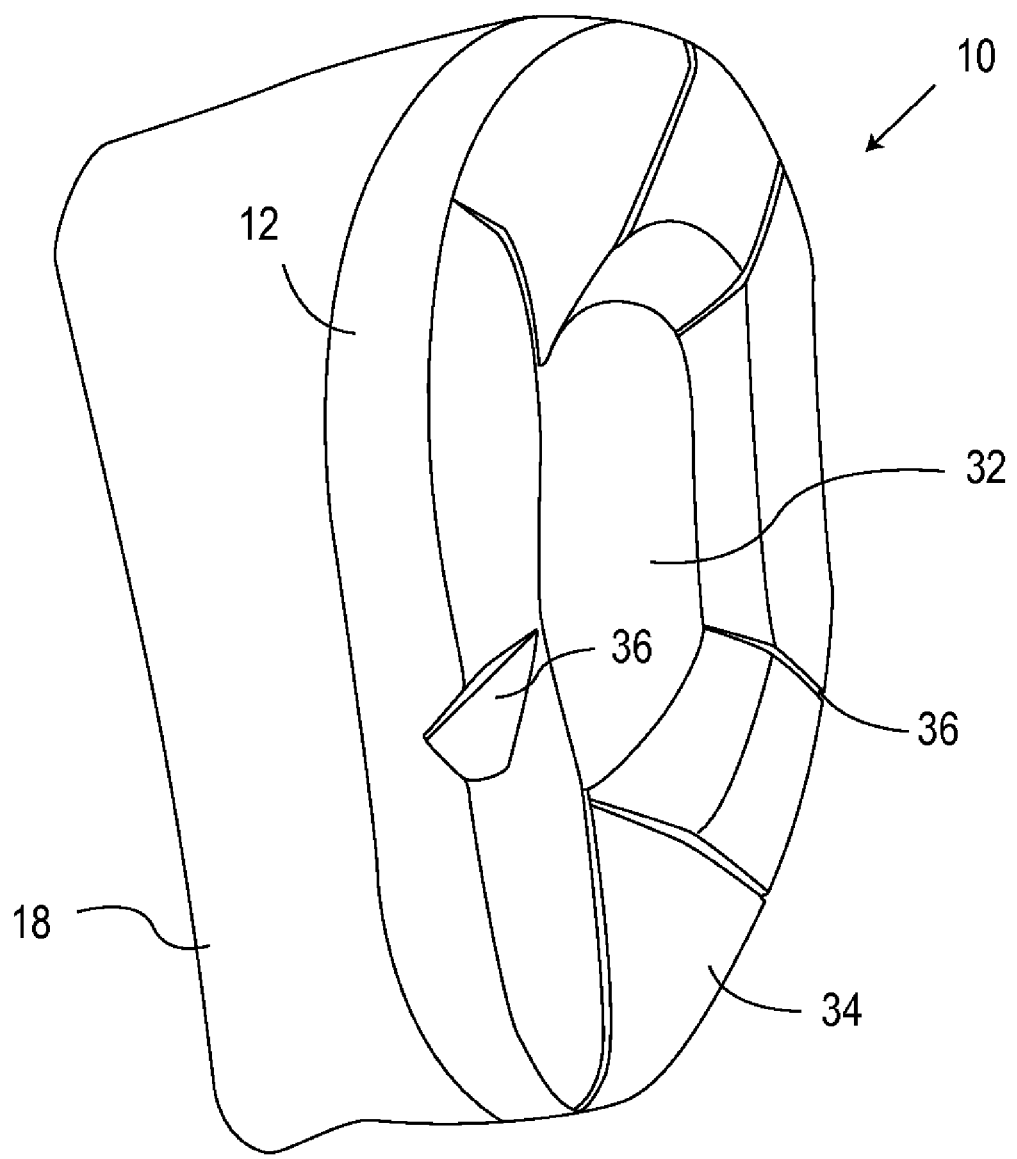
FIG. 5 is another view of the bottom surface of the boot sole according to the invention.

FIG. 3 shows the shell 10 of the boot in rear view without the gaiter 20. According to the invention, the sole 12 is formed with an upper surface 28 shaped as a substantially convex dome-like surface, or dome 30, which is designed to conform substantially to the shape of the frog in the hoof of a horse. Correspondingly, the underside of the sole 12 features a substantially concave cup-like surface, or cup 32, within the larger surface 34 of the sole 12, as seen in FIGS. 4 and 5. The sole 12 also includes treads 36 that may take different forms depending on the conditions of use anticipated for the boot.

The shell 10 of the boot of the invention is preferably made of unitary construction from a strong but somewhat resilient material, such as polyurethane, for suitable protection and support of the hoof under dynamic situations. Because the hoof of the horse expands and contracts during the gait cycle, as explained above, the shell 10 should also be able to expand and contract with the hoof. This will allow the frog and hoof to perform their physiological function of circulating blood in the leg of the horse while also retaining a tight fit through the cycle, thereby avoiding all the problems associated with a loose boot. As should be apparent from the geometry of the described boot shell, the width of the sole 12 tends to expand as the dome 30 is pushed down and flattened by the weight of the horse when the boot meets the ground. As a result, the inner periphery of the upper along the sole will be slightly enlarged allowing the hoof to also expand, as it naturally tends to do under the weight of the horse. When the hoof is lifted from the ground, the resilience of the sole 12 causes the dome 30 to bounce back against the frog of the hoof, which in turn contracts the shell to its original un-deformed shape conforming to the size of the hoof in its newly acquired shape. This provides a comfortable and tight fit throughout the gait cycle without impeding the corresponding natural contraction/expansion cycle of the hoof.

Figure 6:
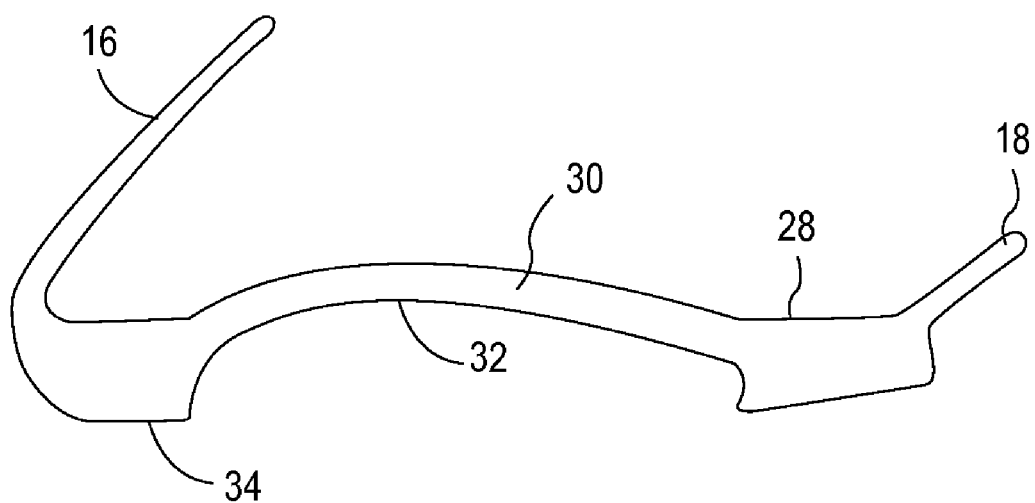
FIG. 6 is a schematic sectioned side view of portions of a boot shell according to the invention showing the dome emerging into the boot from the upper surface of the sole.
Figure 7:
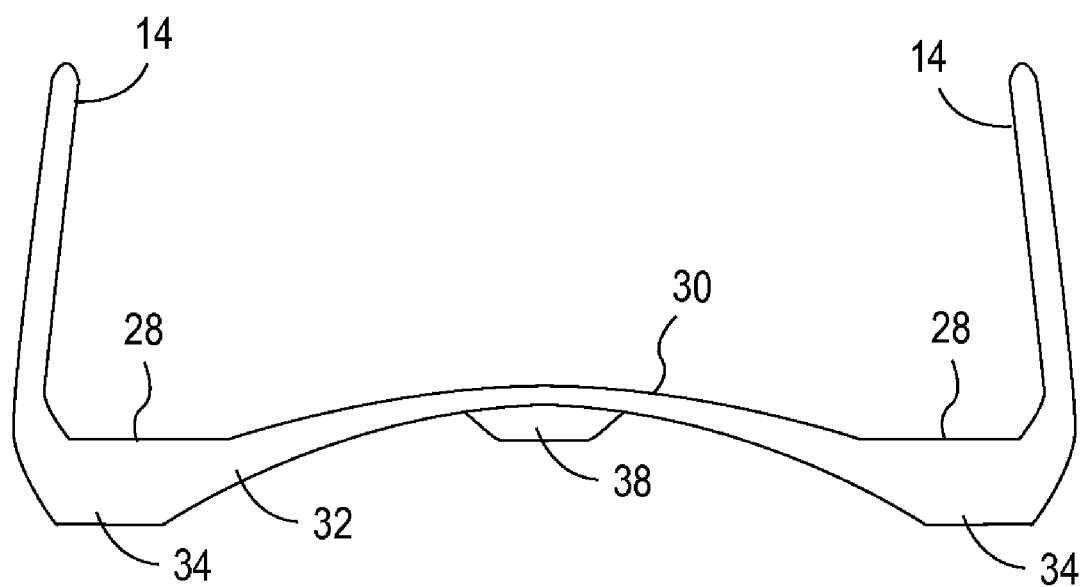
FIG. 7 is a schematic sectioned rear view of other portions of the boot of the invention also illustrating the inverted cup formed in the bottom surface of the sole.

FIGS. 6 and 7 illustrate schematically the intended shape and relative size of various significant components of a boot sole according to the invention. As shown, the sole is characterized by a top surface 28 with a convex portion 30 and a bottom surface 34 with a corresponding concave portion 32. The dome structure is defined by a peripheral, substantially flat ring in the sole of the boot, as illustrated. In one embodiment that has shown to perform well according to the intended purposes of the invention, the ratio of the width of the dome (as seen from the back in FIG. 7) to its height is about 10/1.5 to 10/1.0 (that is, a width of about 100 mm with a height of 10 to 15 mm). A similar ratio is used in the side-view direction of FIG. 6. In practice, while recognizing that that the dome is not perfectly circular, its shape is substantially round; thus, an effective diameter-to-height ratio of about 10 to 1.5 to 10 to 1.0 is preferred.

The dimensions are relative and for illustration only with reference to a typical horse boot, it being understood that different and variable sizes could apply and would be adopted for different horses depending on the boot. In general, it is believed that the best fit will be provided by a boot that fits the hoof snugly when no weight it put on it. In that case, the boot will expand and contract with the hoof during the gait cycle and provide a tight fit all the time with the advantages described above.

The bottom-side concavity of the sole of the invention also provides a ready-made tread for traction of the boot. As seen in FIGS. 6 and 7, the peripheral flat portions of the bottom surface 34 of the sole define a ridge that tracks on soft soil and increases the stability of the boot. A knob 38 may be added at the center of the sole for additional traction. The sole is preferably made of unitary construction with the upper of the boot.

While the invention has been shown and described herein with reference to what are believed to be the most practical embodiments, it is recognized that departures can be made within the scope of the invention and, therefore, the invention is not to be limited to the details disclosed herein but is to be accorded the full scope of equivalent articles.

We claim:

1. In a horse boot including an upper and a sole, said sole being an integrally unitary structure and having a top surface and a bottom surface, the improvement of a resilient, upward facing, substantially concave structure in the bottom surface of the sole and a corresponding substantially convex structure in the top surface of the sole disposed directly above said substantially concave structure so as to produce concurrent flexibility of the concave and convex structures.

2. The horse boot of claim 1, wherein said substantially convex structure has a width-to-height ratio of about 10 to 1.5 to 10 to 1.0.

3. The horse boot of claim 1, wherein the sole is made of unitary construction with the upper of the boot.

4. The horse boot of claim 1, wherein the bottom surface of the sole includes a peripheral ridge defined by said substantially concave structure.

5. The horse boot of claim 1, wherein said substantially convex structure has a width-to-height ratio of about 10 to 1.5 to 10 to 1.0; the bottom surface of the sole includes a peripheral ridge defined by said substantially concave structure; and the sole is made of unitary construction with the upper of the boot.

6. A horse boot comprising:

an upper; and a sole made as an integrally unitary structure with a top surface and a bottom surface;

wherein said top surface of the sole includes a resilient, upward facing, substantially convex structure and said bottom surface of the sole includes a corresponding substantially concave structure disposed directly below said substantially convex structure so as to produce concurrent flexibility of the convex and concave structures.

7. The horse boot of claim 6, wherein said substantially convex structure has a width-to-height ratio of about 10 to 1.5 to 10 to 1.0.

8. The horse boot of claim 6, wherein the sole is made of unitary construction with the upper of the boot.

9. The horse boot of claim 6, wherein the bottom surface of the sole includes a peripheral ridge defined by said substantially concave structure.

10. The horse boot of claim 6, wherein said substantially convex structure has a width-to-height ratio of about 10 to 1.5 to 10 to 1.0; the bottom surface of the sole includes a peripheral ridge defined by said substantially concave structure; and the sole is made of unitary construction with the upper of the boot.

* * * * *